(12) United States Patent
Kleen et al.

(10) Patent No.: US 10,733,887 B2
(45) Date of Patent: Aug. 4, 2020

(54) METHOD AND DEVICE FOR ROAD USER INTERACTION

(71) Applicant: VOLKSWAGEN AKTIENGESELLSCHAFT, Wolfsburg (DE)

(72) Inventors: Andro Kleen, Braunschweig (DE); Adrian Haar, Wolfsburg (DE); Lennart Bendewald, Wolfsburg (DE); Annika Bussius, Wolfsburg (DE)

(73) Assignee: Volkswagon Aktiengesellschaft, Wolfsburg (DE)

( * ) Notice: Subject to any disclaimer, the term of this patent is extended or adjusted under 35 U.S.C. 154(b) by 0 days.

(21) Appl. No.: 16/097,705

(22) PCT Filed: Apr. 24, 2017

(86) PCT No.: PCT/EP2017/059683
§ 371 (c)(1),
(2) Date: Oct. 30, 2018

(87) PCT Pub. No.: WO2017/190973
PCT Pub. Date: Nov. 9, 2017

(65) Prior Publication Data
US 2019/0164424 A1 May 30, 2019

(30) Foreign Application Priority Data
May 4, 2016 (DE) .................. 10 2016 207 791

(51) Int. Cl.
*G08G 1/00* (2006.01)
*G08G 1/0967* (2006.01)
*H04W 4/46* (2018.01)

(52) U.S. Cl.
CPC ... *G08G 1/096791* (2013.01); *G08G 1/09675* (2013.01); *G08G 1/096716* (2013.01);
(Continued)

(58) Field of Classification Search
CPC .......................... G08G 1/096791; H04W 4/46
(Continued)

(56) References Cited

U.S. PATENT DOCUMENTS

2013/0099911 A1 4/2013 Mudalige et al.
2013/0151412 A1* 6/2013 Spahl ............... G06Q 20/40
705/44

(Continued)

FOREIGN PATENT DOCUMENTS

DE 102008040566 A1 1/2010
DE 102012218935 A1 4/2013
(Continued)

OTHER PUBLICATIONS

Search Report for German Patent Application No. 10 2016 207 791.0; dated Feb. 23, 2017.
(Continued)

*Primary Examiner* — Naomi J Small
(74) *Attorney, Agent, or Firm* — Barnes & Thornburg LLP (57) ABSTRACT

A method for interaction between a first road user and a second road user wherein the first road user sends a driving maneuver request into the surroundings of the first road user; the second road user receives a request signal indicative of the driving maneuver request; the second road user accepts the driving maneuver request; acceptance of the driving maneuver request is signaled to the first road user; and driving maneuver recommendations determined based on the driving maneuver request are signaled to the first road user and/or to the second road user.

16 Claims, 11 Drawing Sheets

(52) U.S. Cl.
CPC . *G08G 1/096725* (2013.01); *G08G 1/096741* (2013.01); *H04W 4/46* (2018.02)

(58) Field of Classification Search
USPC .......................................................... 340/902
See application file for complete search history.

(56) References Cited

U.S. PATENT DOCUMENTS

| | | | | |
|---|---|---|---|---|
| 2015/0039211 A1* | 2/2015 | Stefan | .................... | G08G 1/148 701/117 |
| 2015/0100179 A1* | 4/2015 | Alaniz | .................... | A63F 13/00 701/1 |
| 2016/0225260 A1* | 8/2016 | Lin | ......................... | B60R 25/24 |

FOREIGN PATENT DOCUMENTS

| | | |
|---|---|---|
| DE | 102013212255 A1 | 12/2014 |
| DE | 102014200896 A1 | 7/2015 |
| DE | 102014209520 A1 | 11/2015 |
| EP | 1699033 A2 | 9/2006 |
| EP | 2851886 A1 | 3/2015 |
| JP | 2012083995 A | 4/2012 |
| KR | 20150106260 A | 9/2015 |
| WO | 9963502 A2 | 12/1999 |

OTHER PUBLICATIONS

Search Report for International Patent Application No. PCT/EP2017/059683; dated Jul. 25, 2017.

* cited by examiner

FIG. 13 ated in FIG. 12.

METHOD AND DEVICE FOR ROAD USER INTERACTION

PRIORITY CLAIM

This patent application is a U.S. National Phase of International Patent Application No. PCT/EP2017/059683, filed 24 Apr. 2017, which claims priority to German Patent Application No. 10 2016 207 791.0, filed 4 May 2016, the disclosures of which are incorporated herein by reference in their entireties.

SUMMARY

Illustrative embodiments relate to a method for interaction between a first road user and a second road user and also relates to a device for a first road user for interacting with a second road user.

BRIEF DESCRIPTION OF THE DRAWINGS

Disclosed embodiments are now explained with reference to the accompanying drawings. The disclosure is not restricted to the illustrated or described embodiments.

DETAILED DESCRIPTION

DE 10 2012 218 935 A1 discloses a freeway merging assistant and controller, wherein the transportation vehicle merging control system comprises a carrier communication system in a carrier transportation vehicle for interchanging transportation vehicle position and transportation vehicle kinematic data with a remote communication system in at least one remote transportation vehicle. A carrier processor uses positions and movement paths to determine a time until the carrier transportation vehicle and the remote transportation vehicle cross during a merging maneuver, and a carrier transportation vehicle transmits a carrier transportation vehicle intention message to negotiate a merging position between the carrier transportation vehicle and the at least one remote transportation vehicle. The carrier transportation vehicle also carries out the merging maneuver using the negotiated merging position. The driver's merging intention is transmitted and the acceptance of the driver's merging intention by the remote transportation vehicle is received. The driver is informed whether the negotiated merging position is accepted. The carrier transportation vehicle and the remote transportation vehicle can continuously interchange mutual speed profiles and lane positions to coordinate the merging maneuver.

DE 10 2013 212 255 A1 discloses a method for interchanging information between at least two transportation vehicles, wherein the first transportation vehicle transmits information for assessing the free space in front of it to the second transportation vehicle and the latter uses this information to assess and/or initiate corresponding driving maneuvers. An item of information relating to the free space is received by the second transportation vehicle and can be optically or acoustically output to a driver of the second transportation vehicle.

EP 1 699 033 B1 discloses a driver assistance method, wherein a navigation device has a touchscreen and outputs an image in which the driver's transportation vehicle is represented on a map together with road markings. A guidance system can ask the driver whether he wishes to merge into a recommended space and can look for another space or another gap if the driver declines. The transportation vehicle can be equipped with a vehicle-to-vehicle communication system, and the position, speed and acceleration of another transportation vehicle can be received.

JP 2012 083 995 A2 discloses a merging assistance system, wherein transportation vehicle communication is carried out, wherein the position and speed of the transportation vehicle are transmitted, and wherein the transportation vehicle speed is adjusted.

Conventional methods for assisting with the driving behavior of a plurality of road users do not result in smooth, unhindered guidance of the transportation vehicles in all situations. Disclosed embodiments provide a method for interaction between a first road user and a second road user and to propose a device for a first user for interacting with a second road user, wherein drawbacks in the prior art are at least partially overcome.

Disclosed embodiments use human machine interaction (HMI) concepts which are aimed at optimizing the interaction between various road users. Disclosed embodiments can use networking technologies, for example, "Vehicle-to-Vehicle" or "Vehicle-to-Infrastructure" technologies (referred to as "V2V" and "V2X" below). In this case, a conventional WLAN standard or else a mobile communication technology, for instance, 4G or 5G networks, can be used to transmit data and signals, for example. According to disclosed embodiments, these technologies can be used to improve the direct interaction (or else indirect interaction via one or more intermediate stations, for instance, transmitting and receiving masts, servers) between various road users (vehicle to vehicle, vehicle to pedestrian, vehicle to motorcycle, vehicle to truck, etc.). Disclosed embodiments can improve the maneuver-based interaction in the sense of "direct cooperation". Secondarily, it is also possible to optimize the traffic flows in the sense of traffic management.

With regard to the configuration of the display and operating concepts, a fundamental paradigm shift can therefore occur. Conventional systems were substantially aimed at improving the interaction between the driver and his own transportation vehicle systems (for example, for the purpose of controlling driver assistance or infotainment systems). The HMI concepts described in the present application are aimed at optimizing the interaction between different road users. This extended context in which the explicit communication between cooperation partners plays a central role, for example, the transmission of requests or offers, the possibility of accepting or rejecting the latter, the derivation of specific recommended actions etc., provides space for an abundance of innovative interaction concepts which can improve the interaction of various road users in traffic.

Disclosed embodiments can also be highly relevant to the entire automation range. For the field of highly automated systems, the focus may be on external communication concepts which are intended to make the behavior of an automatically driving transportation vehicle with respect to a pedestrian comprehensible, for example, pedestrian was detected, transportation vehicle waits etc. However, results of a large-scale survey show that, according to the prior art, approximately 30% of all cooperation processes fail. The disclosed embodiments aim to reduce or even solve these and further problems. In this case, the disclosed embodiments can implement the process of representing the respective environment of a road user and the intentions of these surrounding road users in a transparent and comprehensible manner. In addition, disclosed embodiments are aimed at improving the ability to communicate this information. Disclosed embodiments also allow the communication complexity to be kept as low as possible. According to disclosed embodiments, the practice of making requests and subsequent offers will not be any more laborious than the communication according to the prior art. Disclosed embodiments can simplify particular interaction operations and can even carry them out automatically.

At least one disclosed embodiment provides a method for interaction between a first road user and a second road user. In this case, the method comprises transmitting a driving maneuver request from the first road user into its surroundings, receiving a request signal indicative of the driving maneuver request in the second road user, accepting the driving maneuver request in the second road user, signaling the acceptance of the driving maneuver request in the first road user, and signaling a respective driving maneuver recommendation determined on the basis of the driving maneuver request to the first road user and/or to the second road user.

The method can be carried out inside a system comprising the two road users or else can be carried out using one or more central entities, for instance, servers, transmitting/receiving units etc. Electromagnetic radio waves can be used to transmit signals between the road users. For example, an industrial WLAN technology or a mobile radio technology can be used to transmit the signals. The road users may be, for example, transportation vehicles, for instance, an automobile, a truck or a motorcycle, or a cyclist or else a pedestrian. The driving maneuver request which is emitted by the first road user can be directed to a multiplicity of other road users in the surroundings, in particular, in the transmission area of the first road user. The surroundings of the first road user can be defined, for example, by the range of a transmitter which is carried by the first road user, for instance, is installed in a transportation vehicle. Alternatively, the surroundings of the first road user can be defined by a further central entity, for instance, a server with transmitting/receiving units which initially receives the driving maneuver request from the first user and, on the basis thereof, emits a request signal indicative of the driving maneuver request, for instance, from one or more transmitting and receiving masts which are outside both the first road user and the second road user. The surroundings may be, for example, an area of space within a circle and first road user which has a radius of 1 to 3 km, for example. Other values are possible.

The second road user can either directly receive the driving maneuver request from the first road user without a derived request signal indicative of the driving maneuver request first having been generated from the driving maneuver request by a further entity or a further transmitter, or can receive the content of the driving maneuver request via the request signal which is indicative of the driving maneuver request and has been generated and emitted by an external transmitter (after receiving the original driving maneuver request). A mobile radio technology, for example, 4G or 5G technology, can be used for this purpose, for example. Both the first road user and the second road user may comprise systems for transmitting and receiving radio signals. For example, both road users may have V2V equipment.

The driving maneuver request can be received in a multiplicity of other road users. Not all of these other road users must accept the driving maneuver request. However, at least the second road user accepts the driving maneuver request and can transmit the acceptance to the first user. The acceptance of the driving maneuver request can be visually signaled in the first road user, in particular, in a freely programmable combination display (also called FPC). The freely programmable combination display can be arranged in a central region of the cockpit of a transportation vehicle, for example, between further instrument displays. The FPC can comprise a two-dimensional screen which is able to display color images. The FPC can be a touchscreen, thus enabling interaction with a driver of the transportation vehicle. On the basis of the driving maneuver request, a first driving maneuver recommendation for the first road user and/or a second driving maneuver recommendation for the second road user can be determined and can also be signaled to the respective road user. The FPC can likewise be used for this signaling. This enables signaling which can be well perceived by the driver, which can facilitate and improve the driving safety and performance of future driving maneuvers.

The driving maneuver request can comprise an intention of the first road user to carry out a particular driving maneuver. Examples of driving maneuvers are, for example, merging on a freeway, a lane change on a freeway, on a highway or in urban traffic, overtaking a transportation vehicle traveling in front, turning left or right, parking in a parking space, in particular, with reversing, allowing another road user which actually has right-of-way to pass, etc.

The driving maneuver recommendation can comprise, for example, braking, acceleration, keeping the speed constant, pulling out, turning, a steering movement, actuation of a transportation vehicle light, etc.

Disclosed embodiments make it possible for various road users to cooperate to reduce mutual obstruction.

The respective driving maneuver recommendation can also be based on a position and/or a speed and/or an acceleration and/or a (previously traveled and/or future (for example, extrapolated)) trajectory of at least one of the road users) and determined and/or can also be determined on the basis of a road geometry. In this case, the driving maneuver recommendation can be continuously calculated on the basis of the changing characteristics of the road user states and can be respectively communicated to the relevant road users and visually displayed there, in particular, in the FPC. The driving maneuver recommendation can therefore be determined with greater accuracy to be determined, in particular, in a consistent (mutually acceptable) manner between the various road users and in such a manner that it can also actually be implemented.

Furthermore, the first and/or the second road user can carry out a respective driving maneuver according to the request and/or according to the relevant driving maneuver recommendation, either by manually controlling the transportation vehicle or by automatic, autonomous control of the transportation vehicle without human interventions.

According to disclosed embodiments, while carrying out respective driving maneuvers in the first road user and/or the second road user according to the driving maneuver request and/or the driving maneuver recommendation, it is possible to visualize both road users and/or the driving maneuver recommendation in the first and/or the second road user. Alternatively or additionally, it is also possible to visualize, in at least one road user to which a driving maneuver recommendation has been signaled, the driving maneuver recommendation together with the road user to which a driving maneuver recommendation has been signaled, in particular, on the FPC. This makes it possible to transmit clear, transparent signaling to respective drivers of the transportation vehicles. For example, the driver's own transportation vehicle can be represented in a central position and in a particular color, whereas the transportation vehicle of the second road user can be represented in a non-central region of the cockpit display and/or in another color, for instance, white. A driving maneuver recommendation can be visualized by arrows (for example, for braking, acceleration, turning), for example. The representation can be carried out in an animated manner, that is to say the movement of the respective other road user is clear as a result of a change in the position of the representation of the other road user over time. It is also possible to carry out an animated representation with an infrastructure, for instance, together with the road.

According to disclosed embodiments, it is also possible to signal to visually represent on the FPC, whether or not a driving maneuver is possible in the first road user and/or the second road user, for example, by accordingly coloring an area which can be traveled on or cannot be traveled on. It is therefore possible to avoid a driving maneuver which could result in a collision, for example. A suitable color representation, for instance, an orange area or a red area, could be used to indicate that a particular region currently cannot be traveled on and the corresponding driving maneuver is therefore not possible.

The method can also comprise transmitting, from one of the road users, its own position and/or its own future driving maneuver and/or its own driving state and/or its own driving light states to the respective other road user. The respective driving maneuver recommendation can therefore be determined in a more reliable manner and a driving maneuver can then be accordingly carried out. Further data relating to the state and movement state of the road users can be interchanged.

The reception of the driving maneuver request can comprise visualizing the driving maneuver request on a display panel in the second road user. This visualization can also represent or comprise, in particular, a desired trajectory of the requesting road user. An easily comprehensible representation can therefore be provided, which can increase safety of the method and reliability.

The acceptance of the driving maneuver request can comprise, in the second road user, manually actuating a switching mechanism (for example, a button, a touchscreen) and/or a voice input and/or actuating a brake lever (for example, a brake pedal) and/or automatic acceptance by an automatic drive controller. The manner in which the driving maneuver request is accepted can be configurable in a corresponding device and can be selected according to the driver's wishes. After the driving maneuver request has been accepted, a display system, in particular, an FPC, can change over to a cooperation context, which can be easily discerned by the driver on account of a changed layout, to signal a connection to or cooperation with another road user in a transparent manner for the driver.

The acceptance of the driving maneuver request can comprise, in the second road user, transmitting a response signal to the first road user. The response signal can be transmitted using the same technology as or using different technology than that used to initially transmit the driving maneuver request from the first user. The response signal can be transmitted to the first road user directly or indirectly via one or more intermediate entities or servers or receiving and transmitting masts.

The acceptance of the driving maneuver request can comprise, in the first road user, signaling and/or visualizing the acceptance and/or displaying the direction of the second road user. The driver can therefore already orient himself to where the cooperation partner is situated. Furthermore, he can prepare himself for his intention to carry out a driving maneuver being supported by another road user.

It is noted that features which have been described, provided or used individually or in any combination in connection with a method for interaction between a first road user and a second road user can likewise be applied, individually or in any combination, to a device for a first road user for interacting with a second road user according to disclosed embodiments.

At least one disclosed embodiment provides a device for a first road user for interacting with a second road user. In this case, the device has a transmitter for transmitting a driving maneuver request from the first road user into its surroundings (also, in particular, a receiver for receiving a response from another road user) and a display device for signaling the acceptance of the driving maneuver request after receiving a request signal indicative of the driving maneuver request and accepting the driving maneuver request in the second road user.

Disclosed embodiments also provide a transportation vehicle, for instance, an automobile, a truck or a motorcycle, comprising a device for a first road user for interacting with a second road user.

Disclosed embodiments also provide a system having a first transportation vehicle and a second transportation vehicle each having a device for interacting with another road user.

Road users which do not wish to accept the driving maneuver request can signal this by inactivity. A rejection can be assumed if a particular road user does not positively respond or does not respond at all to the driving maneuver request within a particular interval of time.

A head-up display (HUD), for example, installed in the interior in front of the windshield, can be used to signal, visualize and/or display the driving maneuver request, the acceptance of this request, the driving maneuver recommendation or other information for one or both of the road users.

A head-up display is a display system in which the driver can retain his head posture or viewing direction because the information can be projected into his field of vision in an otherwise transparent screen. Head-up displays generally comprise an imaging unit, an optics module and a projection area. The imaging unit generates the image. The optics module with a collimator and deflection guides the image onto the projection area. This area may comprise a reflective, transparent panel. The user of the windshield projector therefore sees the reflected information from the imaging unit and, at the same time, the actual world behind the panel. Other display systems can be used, for instance, LED screens, LCD screens, IPS screens, plasma screens etc., which can be integrated in the cockpit, for example.

Figure 1:
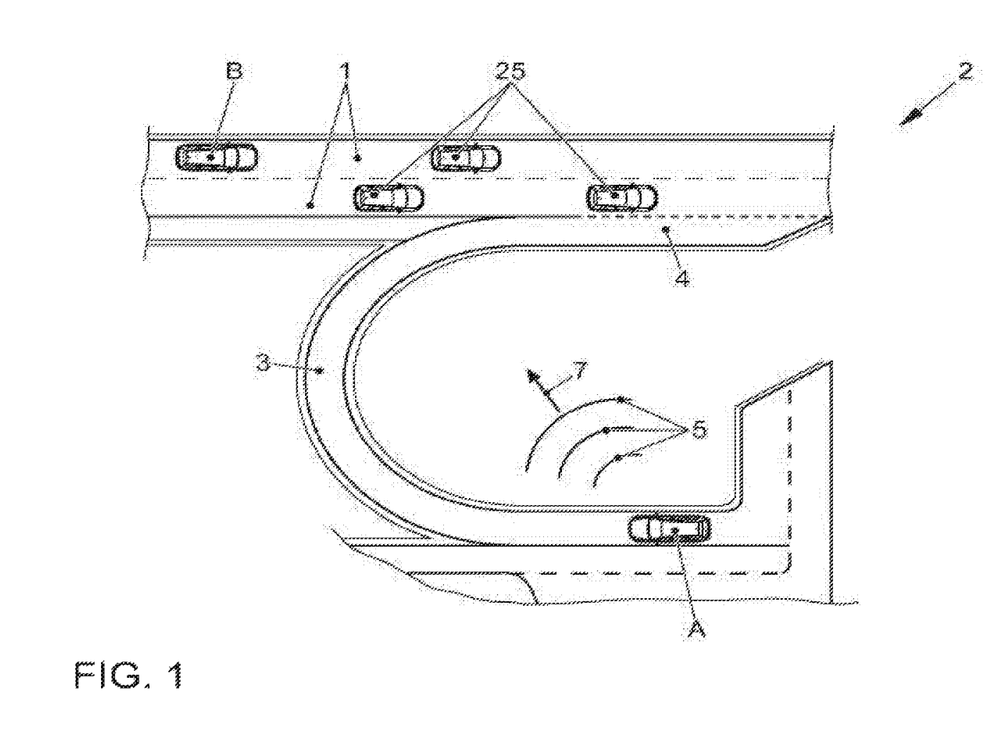
FIG. 1 illustrates a schematic illustration of a traffic situation to which disclosed embodiments can be applied.

To explain a method for interaction between a first road user and a second road user according to at least one disclosed embodiment, a situation 2 of driving onto and merging on a freeway, as schematically illustrated in FIG. 1, is considered below. In this case, FIG. 1 shows a plan view of a part of a freeway having lanes 1, where an on-ramp 3 to the freeway 1 is situated. A transportation vehicle B represents a second road user already driving on the freeway. A transportation vehicle A represents a first road user on the on-ramp 3 wishing to enter the lanes 1 of the freeway. Upon reaching the on-ramp 3, the transportation vehicle A emits a driving maneuver request 7 (a general request) to the surrounding traffic according to at least one disclosed embodiment, which request is transmitted by radio waves 5. The radio waves 5 code the driving maneuver request 7 and are emitted by the transportation vehicle A in all directions. The transportation vehicle A (first road user) therefore searches for a cooperation partner which can support the merging process.

Figure 2:
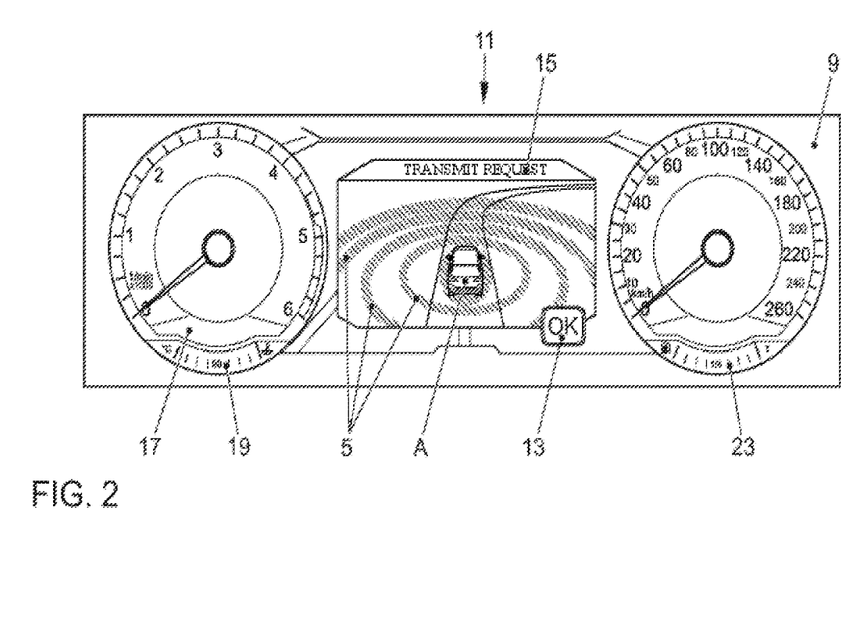
FIG. 2 illustrates a display panel in a transportation vehicle according to a disclosed embodiment during a method for interaction between road users.

To inform the driver of the transportation vehicle A of the transmitted driving maneuver request 7, an FPC-based display is provided, as illustrated in FIG. 2. In this case, FIG. 2 shows a display panel inside the transportation vehicle A (first road user) when the driving maneuver request 7 is emitted. The driving maneuver request 7 comprises the intention of the transportation vehicle A to enter the freeway 1, which requires support for the merging from another road user. The representation on the display panel 9 in the transportation vehicle A comprises a special visualization 11 in a central region, wherein the driver's own transportation vehicle (transportation vehicle A) is represented from behind in the center. Waves 5 which transport the driving maneuver request 7 are indicated as a circle from the transportation vehicle A. The representation 11 may be a pop-up and may be superimposed on the previously displayed content of the FPC. This information can be acknowledged by actuating the "OK" field 13, with the result that the previously displayed content (for example, navigation context) can be displayed again. The acknowledgement can be carried out by a steering wheel button or a knob or a button on a touchscreen. Alternatively, the representation 11 can change to the originally displayed content again after a certain period. The visualization can be carried out by a propagation as waves (animated or as a stationary image) to indicate the propagation or emission of the driving maneuver request 7. Furthermore, running text 15 (or stationary text) can inform of the transmission of the request 7. This operation (transmission of the request) can likewise be illustrated by displaying a simple LED symbol.

The display panel 9 also comprises a tachometer 17, a water temperature indicator 19, a speed indicator 21 and a fuel level indicator 23. The display unit 9 can comprise further elements and can represent further information in the central region 11 depending on requirements.

The driving maneuver request 7 can be received by a plurality of road users 25 (see FIG. 1). However, not all of these road users have to react to this request and therefore do not respond to the request 7. These other road users 25 are therefore excluded as cooperation partners for the transportation vehicle A. The driving maneuver request 7 is also received by the transportation vehicle B.

Figure 3:
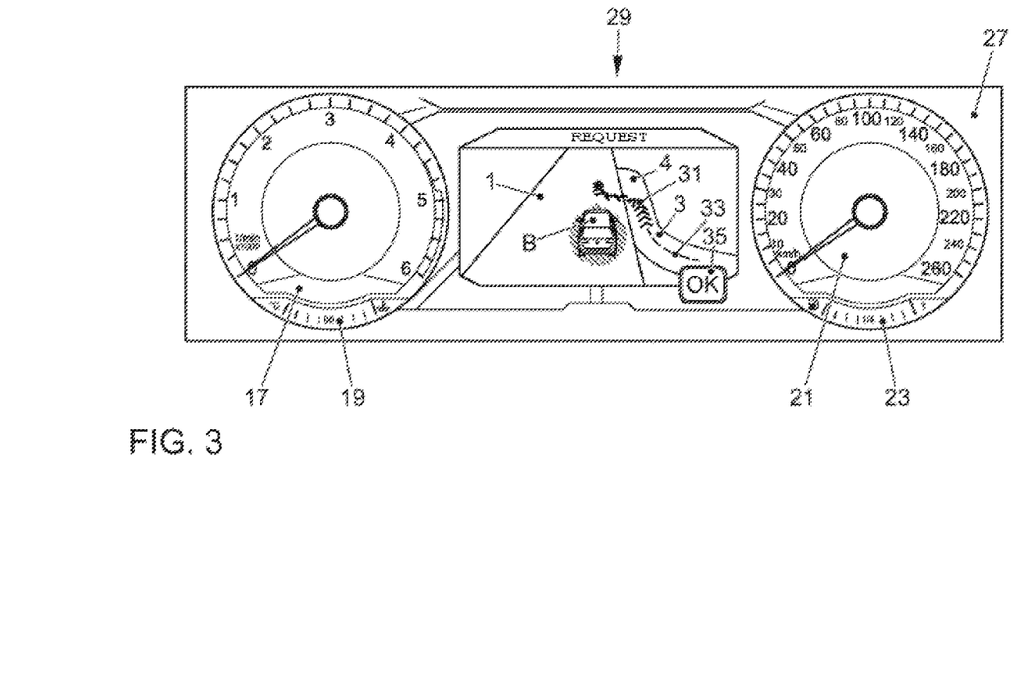
FIG. 3 illustrates a display panel of a transportation vehicle during another method operation according to a disclosed embodiment.

FIG. 3 illustrates a display panel 27 of the transportation vehicle B (second road user) at the time at which a representation 29 providing information relating to a request from a road user appears in the central region of the display panel 27. The driver of the transportation vehicle B can also be informed of the request from the transportation vehicle A by a pop-up, as illustrated in FIG. 3. In this case, the driver's own transportation vehicle is in the center of the screen, that is to say the transportation vehicle B is in the center of the screen in the representation 29. The lanes 1 of the freeway and the on-ramp 3 or the acceleration lane 4 are also indicated. The desired trajectory 31 of the requesting transportation vehicle A is also represented as a colored (for example, orange-colored) line of arrows 31. The route to this merging trajectory is represented as a simple dotted line 33. Different ways of confirming this request are possible. For example, the request can be accepted by explicitly actuating the OK button 35. Alternatively, actuation of the brake, for example, can result in the request being accepted. If the transportation vehicle B does not react to the request within a predetermined period, either nothing at all is transmitted to the transportation vehicle A or a rejection is transmitted to the transportation vehicle A. The representation 29 is then no longer visible. In the case of a positive confirmation, the previously displayed FPC context (for example, navigation or media) is automatically replaced with the cooperation context.

Figure 4:
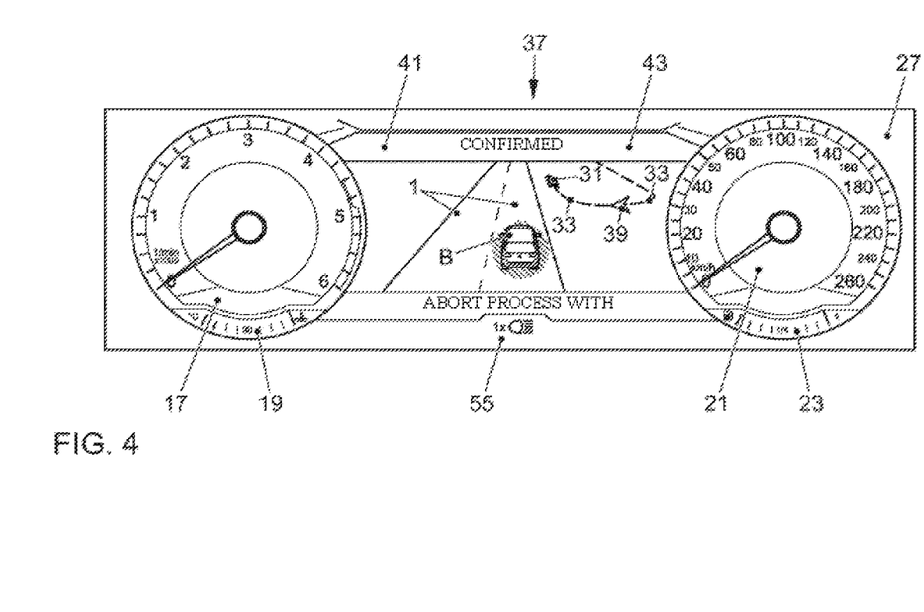
FIG. 4 illustrates a display panel of a transportation vehicle according to a disclosed embodiment during a further method operation.

FIG. 4 illustrates the display panel 27 of the transportation vehicle B after the request from the transportation vehicle A has been accepted. The driver's own transportation vehicle B is again in the center of the representation 37 in the center of the display panel 27. The entire environment, that is to say the digitally known environment or the environment identified by sensors or data evaluation, is represented within a three-dimensional world or surroundings. In this case, the representation comprises both road geometries and infrastructures and physical characteristics of the environment as well as further road users and their properties and intentions. If other road users are still outside the direct interaction area but are important for the interaction, simplified visualizations are used in the sense of representations which are not very complex. As one example, the transportation vehicle A is represented by a white arrow 39. The upper part 31 shows the line of arrows, which has already been described with reference to FIG. 3, as the likely trajectory. The distance which has already been covered is illustrated by the dotted line 33. The horizon of the representation 37 can be used for text messages and for cooperation-based status messages. A display field 41 in the representation 37 indicates that the request has been confirmed. The information field 43 indicates what type of transportation vehicle the transportation vehicle A is. Further recommended actions and trajectories or intentions of other transportation vehicles can be indicated using the information shown in the representation 37.

Figure 5:
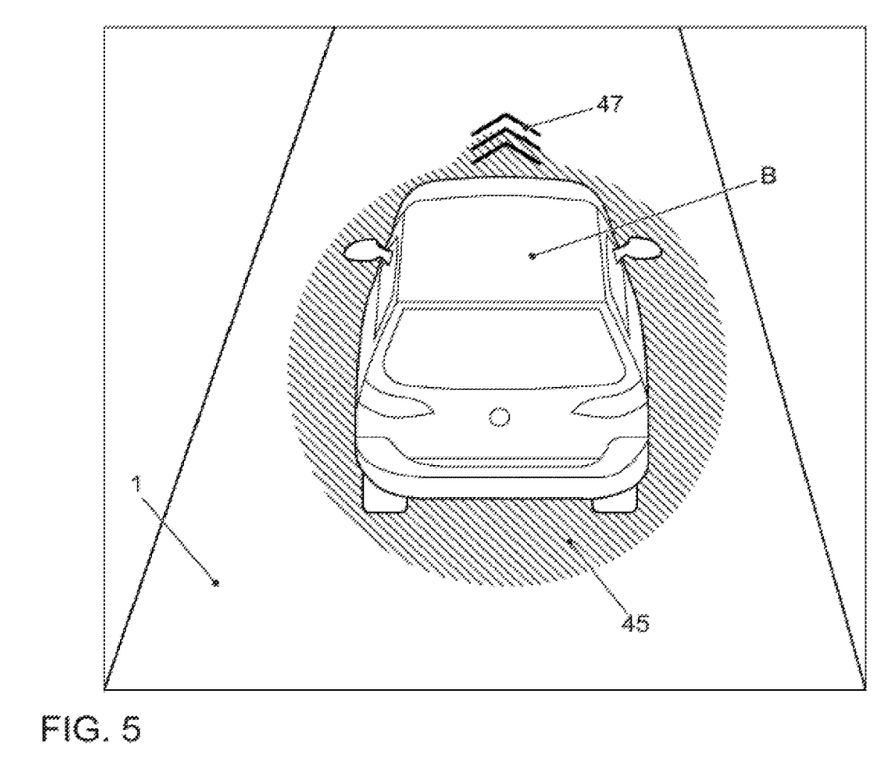
FIG. 5 illustrates a visualization of a transportation vehicle as can be used in disclosed embodiments.

In this case, the driver's own transportation vehicle can be supplemented with graphical properties, as illustrated in greater detail in FIG. 5. A blue-transparent area 45 below the transportation vehicle B, for example, can indicate the cooperation entered into with another transportation vehicle, for example. On the other hand, a line of arrows 47 can indicate a recommended action (also called driving maneuver recommendation). In the example illustrated, the sequence of arrows 47 pointing forward can indicate an acceleration recommendation. Driving maneuver recommendations can be displayed to the driver in different ways. The sequence of arrows 47 can be represented in an animated form.

Figure 6:
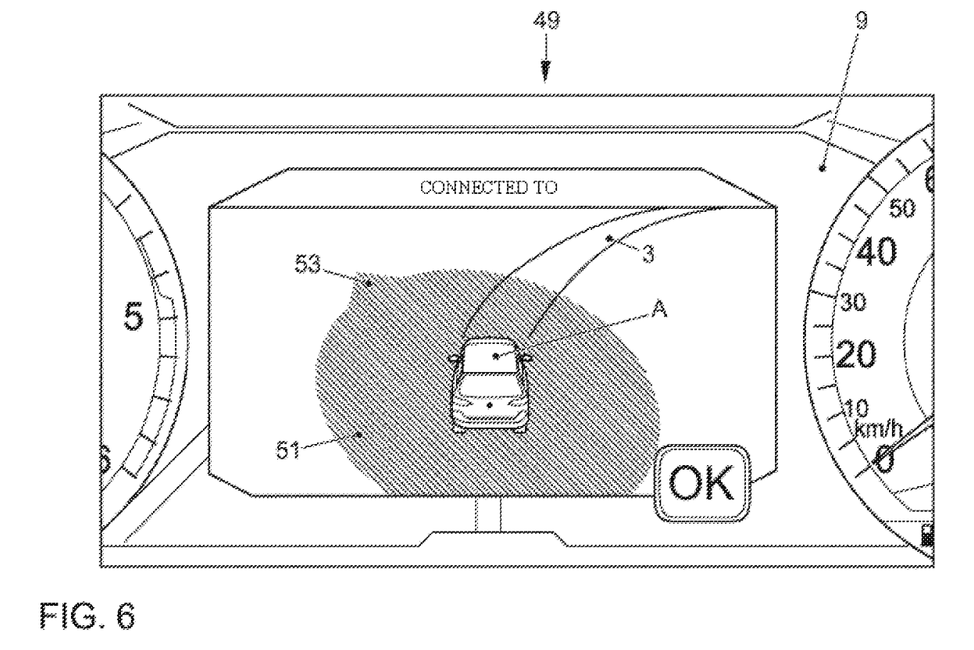
FIG. 6 illustrates a display panel during a method operation according to a disclosed embodiment.

FIG. 6 again illustrates the display panel 9 of the transportation vehicle A, but at a time after the transportation vehicle B has accepted the driving maneuver request 7, with the result that a representation 49 is given on the display panel 9. The confirmation of the request is therefore also visualized to the driver of the transportation vehicle A. Full-area displays and pop-up representations are possible for this purpose. Furthermore, the transparent areas already described above can be used, which areas appear only when cooperation has been entered into or confirmed. In the present example of the representation 49, a transparent area 51 is represented around the transportation vehicle A and an arrow 53 shows the direction of that road user which has accepted the request.

Figure 7:
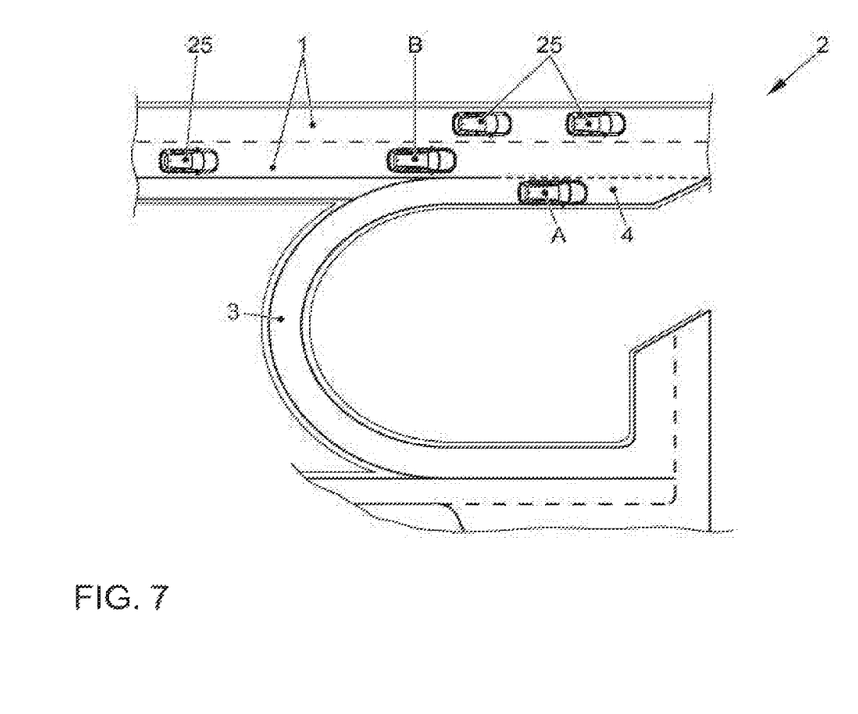
FIG. 7 schematically illustrates a later time of the traffic situation illustrated in FIG. 1.

In the meantime, positions of the transportation vehicle A and of the transportation vehicle B have moved into positions, as illustrated in FIG. 7. If the transportation vehicles are in the direct interaction area, as illustrated in FIG. 7, both transportation vehicles can be displayed in FPC contents of the respective other transportation vehicle. In the meantime, the transportation vehicle A is therefore in the acceleration lane 4 of the freeway 1.

Figure 8:
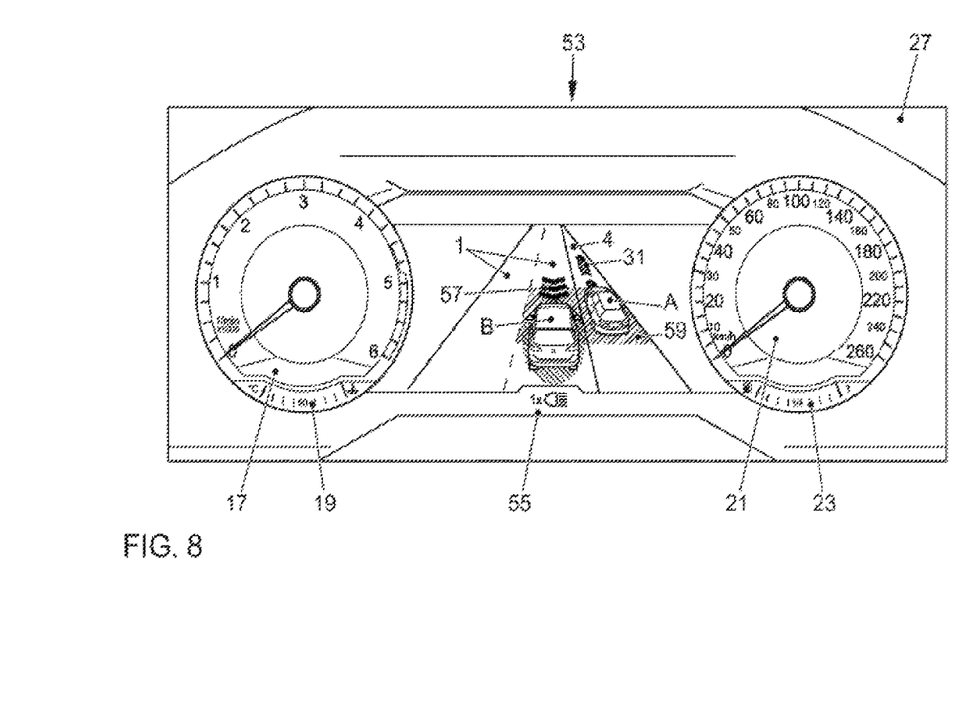
FIG. 8 illustrates a display panel of a transportation vehicle according to a disclosed embodiment a method operation according to a disclosed embodiment.

FIG. 8 illustrates the display panel 27 of the transportation vehicle B at a time corresponding to the time illustrated in FIG. 7. In this case, the digital representation of the transportation vehicle A in the right-hand lane 4 can initially be seen. To be able to better distinguish it from the driver's own transportation vehicle B, the cooperation partners can be represented with a lower level of detail, for example, in white here. Information can also be additionally given using the second transportation vehicle or further transportation vehicles. In this case too, it is possible to use a line of arrows 31, but this can differ from that of the driver's own transportation vehicle in terms of shape, length and color. The trajectory of the other transportation vehicle can be used to visualize its current acceleration behavior and its likely lateral guidance or its current maneuver. The process can be aborted by actuation or one-off actuation of the high beam, as indicated in the information field 55.

At the time illustrated in FIG. 7, the representation 53 is presented in the center of the display panel 27 in transportation vehicle B. The reverse arrows 57 directed downward in front of the driver's own transportation vehicle B indicate a driving maneuver recommendation for the driver's own transportation vehicle B, here a braking recommendation. The area 59 under and beside the transportation vehicle A indicates the area needed to change lane (maneuvering area). The area 59 can have an orange color, for example, and can indicate that a lane change is currently not possible, with the result that a lane change maneuver is not possible. The area 59 which runs under the transportation vehicle A to the adjacent lane represents the space needed to change the driving side ("maneuvering area"). Since the transportation vehicle B is still beside the transportation vehicle A, it is not yet possible to change lane, which is why the area has an orange color. The red line of arrows 57 in front of the transportation vehicle A also represents a braking recommendation.

Figure 9:
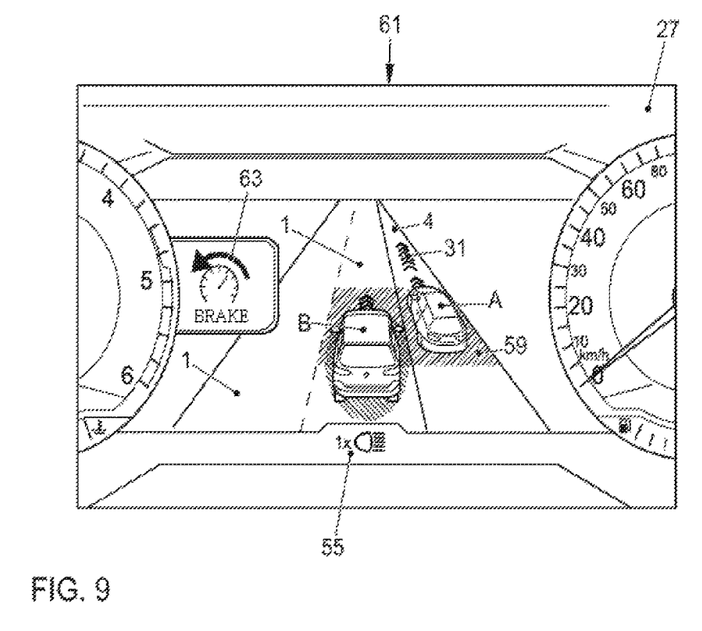
FIG. 9 illustrates an alternative illustration to the illustration shown in FIG. 8.

Alternatively, braking recommendations can also be made by displaying smaller "widgets" having corresponding symbols, as is indicated in an alternative representation 61 of the display panel of the transportation vehicle B by the information field 63 in FIG. 9 at the same time. A temporal sequence of the recommendations or recommendations which are still pending or are not yet current can additionally also be represented by the widgets behind one another.

In addition to driving maneuver recommendations for the transportation vehicle B, driving maneuver recommendations consistent with the recommendations given to transportation vehicle B can also be output to the transportation vehicle A. The recommendations can be consistently determined by identical processors or logic units in the transportation vehicles A and B or can alternatively be determined by a central entity or a master processor in one of the road users. It is therefore possible to ensure that the recommendations for the various road users do not result in unwanted driving situations, for instance, collisions.

Figure 10:
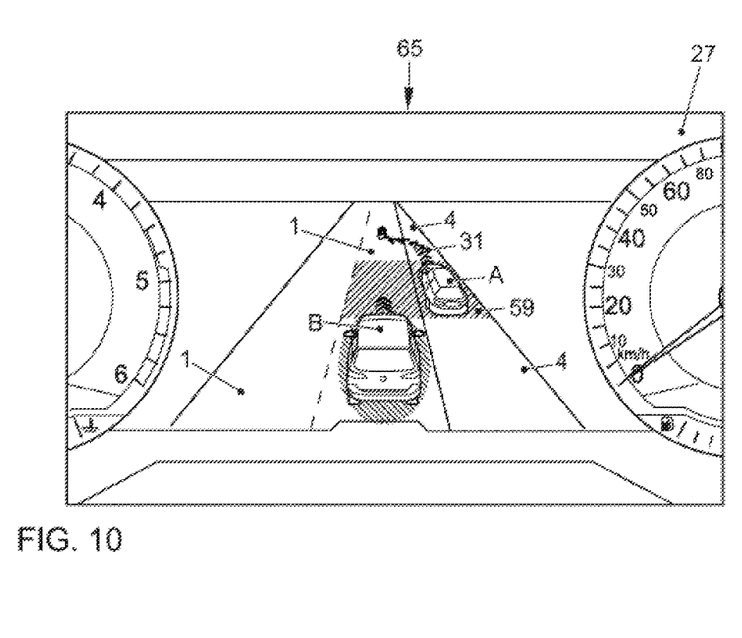
FIG. 10 illustrates a display panel of a transportation vehicle according to a disclosed embodiment in a further method operation according to a disclosed embodiment.

Over the subsequent course of time, the position of the transportation vehicle A changes, as is continuously represented on the display panel 27 of the transportation vehicle B, for instance, in a representation 65 in FIG. 10. In this case, the representation 65 shows an imminent lane change of the transportation vehicle A from the acceleration lane 4 to the lane 1. Since the transportation vehicle A is initially just outside the maneuvering area 59, this is still marked as blocked and therefore has an orange color. In a next operation, this area 59 would either be given a different color or would no longer be represented. transportation Vehicle A would then drive onto the freeway.

In all transportation vehicles represented (the driver's own transportation vehicle and all other transportation vehicles which can be "digitally" detected), the stop lights and possibly also the other light signals can also be displayed according to the actual use. In addition, the graphical representation can also be used to distinguish on the basis of which information the transportation vehicles are represented in the digital environment. Transportation vehicles which have been included in the representation on account of the V2V technology, for example, as described above, can therefore be represented with full areas and with a relatively high degree of detail. Transportation vehicles which have been captured only by an on-board sensor system (radar or ultrasound) could be represented in another manner (for example, in a semi-transparent manner and/or by a standard form). In addition, transportation vehicles which are represented on account of very uncertain information could be visualized in a form which has been reduced even further. BLUETOOTH® or WLAN signals which are picked up and are not emitted for the purpose of identification by other road users can be used as the basis for this very uncertain category, for example. Heat signatures which can be determined by an infrared sensor system are also possible for this purpose.

Figure 11:
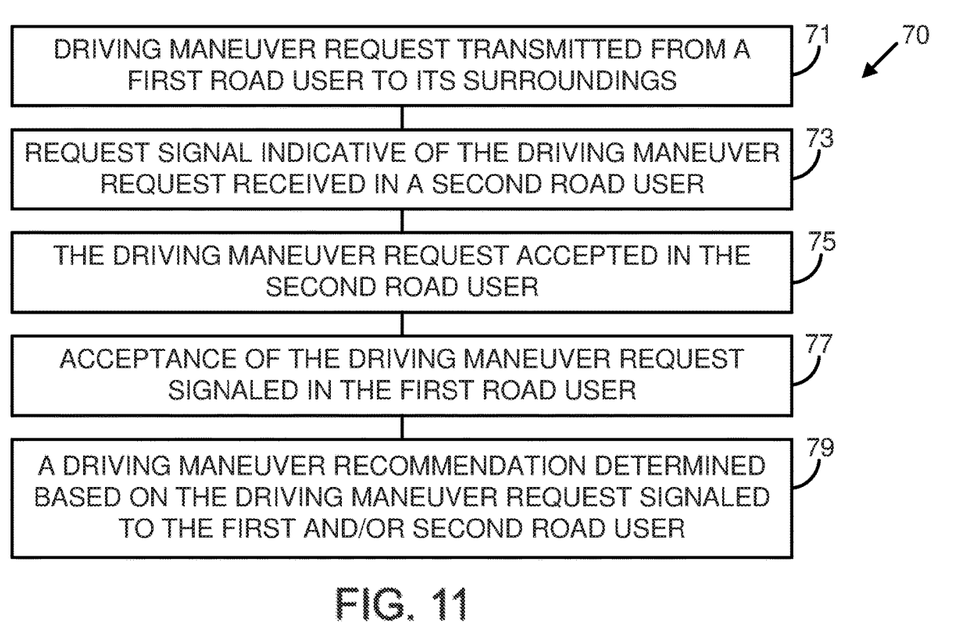
FIG. 11 illustrates a flowchart of an exemplary embodiment of the disclosed method.

FIG. 11 illustrates a sequence of a method 70 for interaction between a first road user and a second road user according to at least one disclosed embodiment. In a method operation at 71, a driving maneuver request is transmitted from the first road user to its surroundings. In a method operation at 73, a request signal indicative of the driving maneuver request is received in the second road user. In a method operation at 75, the driving maneuver request is accepted in the second road user. In a method operation at 77, the acceptance of the driving maneuver request is signaled in the first road user, and, in a method operation at 79, a driving maneuver recommendation respectively determined on the basis of the driving maneuver request is signaled to the first and/or the second road user.

Figure 12:
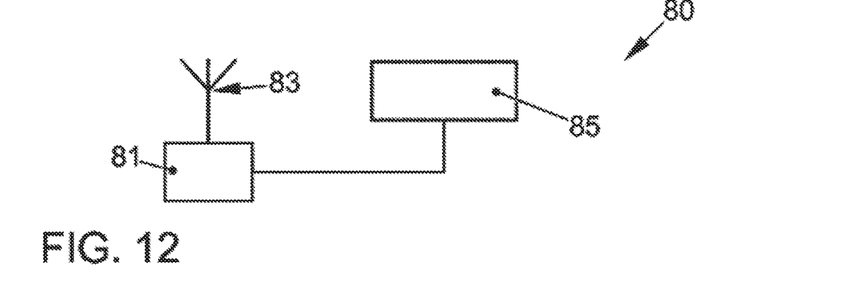
FIG. 12 illustrates a device for a first road user for interacting with a second road user according to a disclosed embodiment.

FIG. 12 schematically illustrates a device 80 for a first road user for interacting with a second road user. The device 8 has a transmitter 81 having an antenna 83 for transmitting a driving maneuver request from the first road user into its surroundings. The device 80 also has a display device 85 for signaling the acceptance of the driving maneuver request after receiving a request signal indicative of the driving maneuver request and accepting the driving maneuver request in the second road user.

Figure 13:
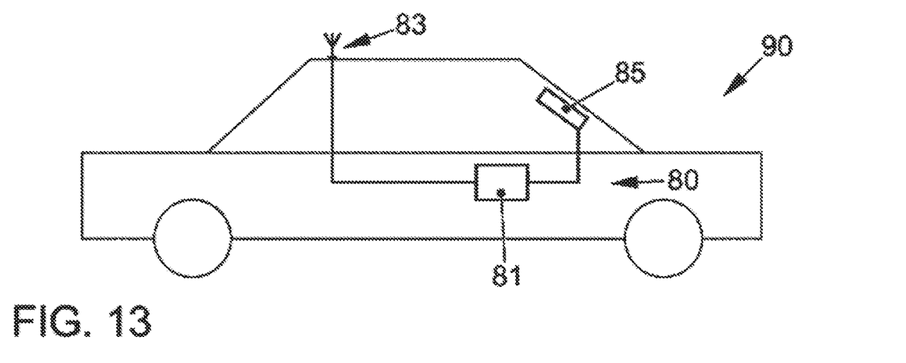
FIG. 13 illustrates a transportation vehicle according to a disclosed embodiment which comprises the device illustrated in FIG. 12.

FIG. 13 schematically illustrates a transportation vehicle 90 according to at least one disclosed embodiment, which transportation vehicle comprises a device 80 as illustrated in FIG. 12.

LIST OF REFERENCE SIGNS

1 Freeway lane
3 On-ramp
4 Acceleration lane
5 Electromagnetic waves
7 Driving maneuver request
A First road user
B Second road user
9 Display panel of the first road user
11 Central representation
13 Confirmation contact area
15 Text information
17 Tachometer
19 Temperature meter
21 Speedometer
23 Fuel level indicator
27 Display panel of the second road user
29, 37, 53, 61 Representations on the display panel of the second road user
31 Future trajectory
33 Previous trajectory
35 Confirmation area
41, 43 Text information areas
39 Position of the transportation vehicle
45 Transparent areas
47 Driving maneuver recommendation of an acceleration
51 Transparent area indicating cooperation
53 Direction to the cooperation partner
49, 11 Representations on the display panel of the first road user
63 Symbol of a braking recommendation
59 Maneuvering area
70 Method
71, 73, 75, 77, 79 Method operations
80 Device for a first road user for interacting with a second road user
81 Transmitter
83 Antenna
85 Display device
90 Transportation vehicle

The invention claimed is:

1. A method for interaction between a first road user and a second road user, the method comprising:
    transmitting a driving maneuver request from the first road user into its surrounding environment;
    receiving a request signal indicative of the driving maneuver request by the second road user;
    accepting the driving maneuver request by the second road user;
    signaling the acceptance of the driving maneuver request to the first road user; and
    signaling a respective driving maneuver recommendation for completing the accepted driving maneuver request to the first road user and/or to the second road user,
    wherein, while carrying out respective driving maneuvers by the first road user and/or the second road user according to the request and/or the driving maneuver recommendation, the method further comprises:
    displaying a visual representation of road geometries in the surrounding environment of the first and/or second road user to the first and/or second road user; and
    displaying visual representations of both the first and second road users in their relative orientations on the visual representation of the road geometries to the first and/or the second road user; and/or
    displaying a visual representation of the driving maneuver recommendation on the visual representation of the road geometries to the first and/or second road user.

2. The method of claim 1, wherein the respective driving maneuver recommendation is determined based on a position and/or a speed and/or an acceleration and/or a trajectory of at least one of the road users and/or a road geometry.

3. The method of claim 1, further comprising signaling whether or not a driving maneuver is possible to the first road user and/or the second road user.

4. The method of claim 1, further comprising transmitting, from one of the road users, its own position and/or its own future driving maneuver and/or its own driving state and/or its own driving light states to the respective other road user.

5. The method of claim 1, wherein the reception of the driving maneuver request comprises displaying a visual representation of the driving maneuver request on a display panel for the second road user.

6. The method of claim 1, wherein the acceptance of the driving maneuver request by the second road user comprises manually actuating a switching mechanism and/or a voice input and/or actuating a brake lever and/or automatic acceptance by an automatic drive controller.

7. The method of claim 1, wherein the acceptance of the driving maneuver request by the second road user comprises transmitting a response signal to the first road user.

8. The method of claim 1, wherein signaling the acceptance of the driving maneuver request comprises signaling and/or visualizing the acceptance and/or displaying the direction of the second road user to the first road user.

9. A device for a first road user for interacting with a second road user, the device comprising:
    a transmitter configured to transmit a driving maneuver request from the first road user into its surrounding environment;
    a display unit configured to signal an acceptance of the driving maneuver request to the first road user in response to the second road user receiving a request signal indicative of the driving maneuver request and accepting the driving maneuver request, wherein a driving maneuver recommendation for completing the accepted driving maneuver request is signaled to the first road user on the display unit,
    wherein, while carrying out respective driving maneuvers by the first road user and/or the second road user according to the request and/or the driving maneuver recommendation, the display unit is configured to:
    display a visual representation of road geometries in the surrounding environment of the first road user to the first road user; and display visual representations of both the first and second road users in their relative orientations on the visual representation of the road geometries to the first road user; and/or display a visual representation of the driving maneuver recommendation on the visual representation of the road geometries to the first road user.

10. The device of claim 9, wherein the driving maneuver recommendation is determined based on a position and/or a speed and/or an acceleration and/or a trajectory of at least one of the road users and/or a road geometry.

11. The device of claim 9, wherein whether or not a driving maneuver is possible is signaled on the display unit to the first road user.

12. The device of claim 9, wherein the device transmits from the first road user its position and/or its future driving maneuver and/or its driving state and/or its driving light states to the second road user.

13. The device of claim 9, wherein the reception of the driving maneuver request includes displaying a visual representation of the driving maneuver request on a display unit for the second road user.

14. The device of claim 9, wherein the acceptance of the driving maneuver request by the second road user comprises manually actuating a switching mechanism and/or a voice input and/or actuating a brake lever and/or automatic acceptance by an automatic drive controller.

15. The device of claim 9, wherein the acceptance of the driving maneuver request by the second road user comprises transmitting a response signal to the first road user.

16. The device of claim 9, wherein the acceptance of the driving maneuver request comprises signaling and/or visualizing the acceptance and/or displaying the direction of the second road user to the first road user.

* * * * *